Patented Sept. 5, 1933

1,925,178

UNITED STATES PATENT OFFICE 1,925,178

TREATMENT OF TEXTILE MATERIALS

George Holland Ellis, Spondon, near Derby, England, assignor to Celanese Corporation of America, a corporation of Delaware No Drawing. Application April 2, 1930, Serial No. 441,184, and in Great Britain April 29, 1929

12 Claims. (Cl. 8—5)

This invention, which is a continuation in part of the invention described and claimed in U. S. patent application S. No. 330,149 filed 3rd January, 1929, relates to the production of pattern effects on fabrics or other materials made of or containing cellulose acetate or other organic esters of cellulose, for example cellulose formate, propionate or butyrate or the products obtained by the treatment of alkalized cellulose with esterifying agents, (e. g. the product known as "immunized cotton" obtained with p-toluene sulphochloride) or made with or containing cellulose ethers, for instance methyl, ethyl or benzyl cellulose or the corresponding condensation products of cellulose and glycols or other polyhydric alcohols.

According to the aforesaid U. S. patent application S. No. 330,149 very good discharge effects may be obtained on materials made of or containing cellulose acetate or other organic substitution derivatives of cellulose by means of chlorates, which is unexpected in view of the known difficulties which are experienced in the production of discharges on such materials by means of reducing agents such as sulphoxylates.

It has now been found that very satisfactory discharge effects may also be produced if the chlorates in the discharging agents used according to the said U. S. specification are replaced, preferably in part, by chromates for example sodium and potassium chromates.

The discharging preparations may be applied to the materials by any suitable means of local application, for example by machine or hand block printing, spraying, stencilling or the like. They may contain any desired thickening agents to render them suitable for local application.

As in the process described in U. S. patent application S. No. 330,149 the colorations to be discharged according to the present invention may be those produced by means of any suitable oxidizable coloring matters for example many of the dyestuffs of the di- and tri- aryl methane, thiazine, oxazine, azine, azo, xanthene, and indigoid series, also certain coloring matters of the amino anthraquinone series.

For the production of illuminated discharges, there may be incorporated in the discharge preparations any suitable coloring matters resistant to oxidation which have affinity for or can be fixed on the material, for example those specified in U. S. patent application S. No. 330,149.

It has further been found that the discharges produced on cellulose ester or ether materials, whether by the processes of U. S. patent application S. No. 330,149 or by the use of chromates or other oxidizing agents, e. g. those specified in U. S. patent application S. No. 290,883, filed 6th July, 1928, may be illuminated by incorporating in the discharge preparations many of the insoluble or difficultly soluble coloring matters of the nitrodiarylamine or amino-anthraquinone series, commonly used for the coloration of cellulose ester and ether materials. Care should be exercised, however, in the choice of dyestuffs of the amino-anthraquinone series since some members of this class having a substituent, particularly hydroxyl or amino, in the para position to the amino group are insufficiently resistant to the action of oxidizing discharge preparations.

It has however been found that the acidylamino-anthraquinone coloring matters are especially resistant to the action of oxidizing agents and are particularly useful for incorporation in oxidizing discharge preparations, whether these preparations contain chlorates or chromates or any other oxidizing agents. The acidylaminoanthraquinones may contain in addition to acidylamino groups other substituent groups or atoms such as hydroxyl groups, alkoxyl groups, and halogen atoms. Of this group of coloring matters the aliphatic acidylamino-anthraquinones are of especial interest for use in colored discharge preparations for application to cellulose ester or ether materials owing to their good affinity for such materials. The following are examples of such aliphatic acidylamino-anthraquinones and the colorations yielded by them when used for illuminating discharges on cellulose ester or ether materials.

1-Acetylamino-anthraquinone _____ Yellow
1-Propionylamino-anthraquinone_____ Yellow
1-Acetylamino-2-methyl anthraquinone
           Yellow (less green)
1-Acetylamino-4-hydroxy anthraquinone
           Golden orange
1-Propionylamino-4-methoxy anthraquinone_____Golden yellow
1:4-Di (propionylamino) anthraquinone ____ Red
1-Methylamino-4-acetylamino-anthraquinone_____Reddish violet
1:4-Di (acetylethylamino) anthraquinone___ Red
1:5-Di (acetylamino)-4:8-dihydroxy anthraquinone _____Red
1-Propionylmethylamino-4:5-dihydroxy anthraquinone _____Red
1:4-Di (acetylmethylamino)-5:6-dihydroxy-anthraquinone _____Violet
2-propionylamino-anthraquinone
         Pale greenish yellow The above aliphatic acidylaminoanthraquinones may be prepared by treating the corresponding aminoanthraquinone or aminoanthraquinone derivative with the acid anhydride, acetic or propionic, in acetic acid solution.

The resistant insoluble or difficultly soluble coloring matters whether of the nitrodiarylamine, aminoanthraquinone, or acidylaminoanthraquinone series, may be incorporated in the discharge preparations in the form of aqueous suspensions or dispersions containing or not containing dispersing agents and/or protective colloids stable towards the other constituents of the preparations.

The following examples show the best way known to me for carrying the invention into effect but are not intended to be in any way limitative.

Example 1

A woven fabric composed of cellulose acetate yarns is dyed by a known method with 2% of its weight of malachite green (Colour Index No. 657) and after drying is printed with a printing paste composed as follows:—

|  | Grams |
|---|---|
| Gum arabic 1:1 | 400 |
| Aluminium sulphate 1:1 | 190 |
| Sodium chlorate | 30 |
| Potassium bichromate | 40 |
| Sodium bichromate | 20 |
| Potassium ferricyanide | 30 |
| Water | 290 |
|  | 1000 |

After printing, the material is dried and steamed in the cottage steamer for 10 minutes with steam at 5 lbs. pressure. The fabric is then rinsed and soaped lightly. A white pattern on a green ground is thus obtained.

Example 2

A woven fabric composed of cellulose acetate yarns is dyed by a known method with 2% of its weight of Crystal Violet (Colour Index No. 681) and after drying is printed with printing pastes composed as follows:—

(1)

|  | Grams |
|---|---|
| Gum arabic 1:1 | 500 |
| Aluminium sulphate 1:1 | 75 |
| Sodium chlorate | 75 |
| Water | 140 |
| 4-chlor-2-nitro-4'-ethoxy-diphenyl-amine (20% water paste) | 100 |
| Methylated spirits | 100 |
| Potassium ferricyanide | 10 |
|  | 1000 |

(2)

|  | Grams |
|---|---|
| Gum arabic 1:1 | 500 |
| Aluminium sulphate 1:1 | 75 |
| Sodium chlorate | 75 |
| Water | 140 |
| 1-amino-2-methyl anthraquinone (20% water paste) | 100 |
| Methylated spirits | 100 |
| Potassium ferricyanide | 10 |
|  | 1000 |

After printing, the fabric is dried and steamed 20 minutes at 5 lbs. pressure in a cottage steamer. The material is then rinsed and soaped lightly. A golden orange pattern and an orange pattern on a violet ground are thus obtained.

Example 3

A fabric composed of cellulose acetate yarns is dyed by a known method with 5% of its weight of Violet PDH (Colour Index No. 893), and after drying is printed with a printing paste composed as follows:—

|  | Grams |
|---|---|
| Gum arabic 1:1 | 440 |
| Aluminium sulphate 1:1 | 190 |
| Sodium chlorate | 90 |
| 1:4 di(monomethylacetyl)-aminoanthraquinone (20% water paste) | 150 |
| Water | 100 |
| Potassium ferricyanide | 30 |
|  | 1000 |

After printing the fabric is dried and steamed 15 minutes at 5 lbs. pressure in the cottage steamer. The material is then rinsed and soaped lightly. A bright red design on a blue ground is obtained.

What I claim and desire to secure by Letters Patent is:—

1. Process for the production of discharge effects on materials containing organic derivatives of cellulose, comprising the local application of a composition containing a chromate and an acid reacting substance followed by steaming.

2. Process for the production of discharge effects on materials containing cellulose acetate, comprising the local application of a composition containing a chromate and an acid reacting substance followed by steaming.

3. Process for the production of discharge effects on materials containing organic derivatives of cellulose, comprising the local application of a composition containing a chromate, a chlorate and an acid reacting substance followed by steaming.

4. Process for the production of discharge effects on materials containing cellulose acetate, comprising the local application of a composition containing a chromate, a chlorate and an acid reacting substance followed by steaming.

5. In the production of colored discharge effects on materials containing organic derivatives of cellulose, applying locally an oxidizing discharging agent containing an insoluble coloring matter selected from the group of nitro diarylamines, amino anthraquinones, and acidyl amino anthraquinones and then steaming.

6. In the production of colored discharge effects on materials containing cellulose acetate, applying locally an oxidizing discharging agent containing an insoluble coloring matter selected from the group of nitro diarylamines, amino anthraquinones, and acidyl amino anthraquinones and then steaming.

7. In the production of colored discharge effects on materials containing cellulose acetate, applying locally a chlorate discharging agent containing an insoluble coloring matter selected from the group of nitro diarylamines, amino anthraquinones, and acidyl amino anthraquinones and then steaming.

8. In the production of colored discharge effects on materials containing cellulose acetate, applying locally an oxidizing discharging agent containing an insoluble aliphatic acidyl amino anthraquinone coloring matter and then steaming.

9. In the production of colored discharge effects on materials containing cellulose acetate, applying locally a chlorate discharging agent containing an insoluble aliphatic acidyl amino anthraquinone coloring matter and then steaming.

10. In the production of colored discharge effects on materials containing cellulose acetate, applying locally a chlorate discharging agent containing 1:4-di(monomethyl acetyl)-amino anthraquinone and then steaming.

11. In the production of colored discharge effects on materials containing cellulose acetate, applying locally an oxidizing discharging agent containing 1-amino-2-methyl anthraquinone and then steaming.

12. In the production of colored discharge effects on materials containing cellulose acetate, applying locally a chlorate discharging agent containing 1-amino-2-methyl anthraquinone and then steaming.

GEORGE HOLLAND ELLIS.